ns Patent [19]
Groce

[11] 3,874,278
[45] Apr. 1, 1975

[54] COOKING UNIT

[76] Inventor: William H. Groce, 1318 N. Poinsett St., Greer, S.C. 29651

[22] Filed: May 10, 1973

[21] Appl. No.: 358,995

[52] U.S. Cl. ............................. 99/421 H, 99/448
[51] Int. Cl. ........................................ A47j 37/04
[58] Field of Search ............ 99/421, 339, 340, 386, 99/419, 420, 443, 446, 447, 479; 98/40

[56] References Cited
UNITED STATES PATENTS

| | | | |
|---|---|---|---|
| 2,130,259 | 9/1938 | Bonaguidi | 99/421 HH |
| 2,304,578 | 12/1942 | Leisenheimer | 99/479 X |
| 2,558,569 | 6/1951 | Koch | 99/421 V X |
| 3,019,720 | 2/1962 | Topper | 99/421 HH X |
| 3,413,911 | 12/1968 | Phelan et al. | 99/446 X |
| 3,458,686 | 7/1969 | Gvozdjak | 99/447 X |
| 3,568,590 | 3/1971 | Grice | 99/447 X |

Primary Examiner—Robert W. Jenkins
Assistant Examiner—Arthur O. Henderson
Attorney, Agent, or Firm—Wellington M. Manning, Jr.

[57] ABSTRACT

An improved cooking unit is described having a housing with a stack for smoke outlet and having food cooking areas disposed in the housing. A tray for receiving charcoal or an artificial heat source is disposed at the lower end of each cooking area with a food support being rotatably secured above the source of heat, all supports being rotated by a common drive. Each cooking area is vented for smoke escape adjacent the side walls of the housing when an access door thereto is closed. An adjustable smoke diverter is provided adjacent each access door. The smoke diverter is opened prior to opening the access door whereby smoke from the cooking area is diverted away from the open door which thus prevents escape of smoke into the area surrounding the cooking unit. A plurality of cooking areas may be provided for each cooking unit. Tray supports may also be provided adjacent each door.

5 Claims, 9 Drawing Figures

COOKING UNIT

BACKGROUND OF THE INVENTION

Diverse types of cooking units for charcoaling, barbequeing and the like have heretofore been developed for both household and commercial utilization. Techniques have been devised for improved driving arrangements for rotating food that is suspended over a source of heat to insure even cooking of same. Likewise, various and sundry techniques have heretofore been devised for improvements directed to the source of heat, to rotatable supports for food being cooked such as spits, baskets and the like; and to housings and the like for the cooking units per se. The art has thus become generally refined insofar as the availability of equipment for cooking hams, steaks, chickens, ribs and the like, especially for commercial cooking so as to improve the quality of the cooked food, to improve the productivity of the units; to facilitate ease of operation of the units and to improve cleanliness or ease of cleaning of the units.

The present invention is yet another improvement in cooking units and provides an overall unit in which the individual cooking areas may be employed simultaneously or separately as desired; in which the food supports are evenly and uniformly driven; which is capable of the "old time" cooking, in that, provision is made for receiving charcoal, hickory chips or the like for supplying heat to the food being cooked; and in which improved means are provided for dissipation of smoke from the cooking area during cooking and especially when access doors in the housing of the unit are opened so as to visually inspect the food, to baste the food, to remove the food or the like.

The prior art is devoid of any teaching or suggestion of the improved cooking unit of the present invention. Exemplary of the prior art are U.S. Pat. Nos. 2,577,184 to Dietrich et al.; 2,618,730 to Panken; 2,722,882 to Wilson; 2,821,905 to Culligan; 3,025,783 to Coudek; 3,028,801 to Watts; 3,088,396 to Proffitt; 3,103,161 to Whitehead; 3,269,299 to Nielsen; and 3,552,299 to Patoka.

SUMMARY OF THE INVENTION

It is an object of the present invention to provide an improved cooking unit.

Another object of the present invention is to provide an improved cooking unit having a plurality of cooking areas located therein.

Still another object of the present invention is to provide a novel cooking unit having an improved smoke handling arrangement therein.

Still further, another object of the present invention is to provide an improved commercial cooking unit for the authentic charcoaling of various and sundry foods.

Generally speaking, the cooking unit of the present invention includes a housing, said housing having a plurality of walls defining same, at least one door being received in said walls; at least one cooking area within said housing, said area having rotatable food support means thereat; drive means associated with said food support means to provide rotary motion thereto; flue means associated with said housing and in communication therewith, said flue means directing smoke from within said housing; and adjustable smoke diverter means adjacent said at least one door and said at least one cooking area, said diverter means being operable to divert smoke away from said at least one door as desired.

More specifically, the present invention in a preferred embodiment discloses a housing made up of walls that define a cooking enclosure. Within the enclosure, a plurality of separate, partially enclosed cooking areas are disposed one above the other with each area being equipped with rotatable food support means, an access door and a source of cooking heat. Preferably, the cooking area is provided with a fire box at the lower end thereof in which charcoal, hickory chips or the like may be placed for burning so as to provide the source of cooking heat. Furthermore, a common drive unit may be provided for all of the cooking areas with a drive chain uniting the rotatable food support with a single source of power for same.

The cooking unit housing of the present invention is provided with a common flue at an upper end thereof through which smoke may be dissipated from the unit. Smoke channels are thus provided between the housing and the cooking area enclosure that afford communication between the individual cooking areas and the common flue whereby smoke is exhausted from all the individual cooking areas through the flue. A portion of the channel exists adjacent the access doors for the cooking areas. Since the access doors will be opened on numerous occasions for basting the food, removing the food and replacing it with additional food to be cooked and the like, it is desirable to further provide the unit with the capability to divert the smoke from the door at such times as the door is opened to prevent smoke from billowing out into the face of one working around the unit, to avoid concealment of the food by smoke and to prevent smoke from escaping the unit into the area generally surrounding same.

The rotatable food supports may be in the form of an elongated spear-like element, commonly referred to as a spit, a basket that is rotatably supported at the ends thereof, or the like. The food supports are journaled for rotation at one side of the cooking area and are drivingly secured to the drive means at the opposite side of the cooking area. The drive means may provide for direct connection between the support and a drive pulley or may be connected through a gear arrangement to the drive pulley.

Smoke diverter means are preferably hingedly secured to a portion of the enclosure for the cooking areas with a pull handle or the like hingedly secured to a portion thereof such that upon pulling the handle, the diverter is pivoted around its hinged connection away from the enclosure for the cooking area to provide a more direct route for smoke to pass from the cooking area to the flue. As such, the smoke from the cooking area escapes same prior to reaching the access door when the door is open and thus does not escape into the surrounding area.

The cooking unit housing according to the present invention may also be provided with further features to improve the utility thereof. Certain doors or panels may be provided, for example, to permit access to the interior of the housing where maintenance or repair may be needed. Access doors may be provided with thermally insulated glass to permit visual inspection of the cooking areas without an appreciable loss of heat therethrough. Tray receiving elements may be provided beneath each access door to hold a tray having food thereon or to receive food thereon, whereby an individual has both hands available for manipulation of the food, the food supports or the like.

DESCRIPTION OF THE PREFERRED EMBODIMENTS

Figure 5:
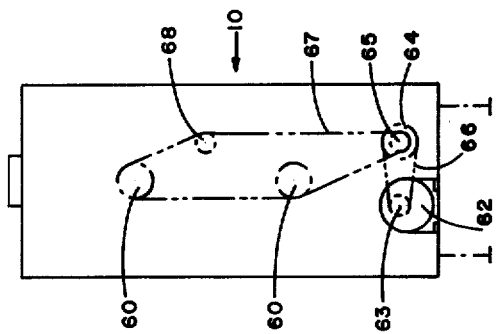
FIG. 5 is an elevational view of a cooking unit according to the teachings of the present invention illustrating the drive means for the rotatable food supports.

Making reference to the Figures, preferred embodiments of the present invention will now be described in detail. FIGS. 1 through 5 generally illustrate the improved cooking unit of the present invention. A housing generally indicated as 10 is illustrated and is made up of a front wall 12, side walls 14 and 16, a back wall 18, a bottom wall 17 and a top wall 19. Housing 10 is supported by a plurality of legs 11 that are secured to bottom wall 17 and rest on a supporting surface (not shown) though other suitable support means may be employed. Furthermore, top wall 19 has a flue section 19' that is adapted to be connected to a smoke exhaust flue 15 as shown in phantom in FIG. 1.

Figure 1:
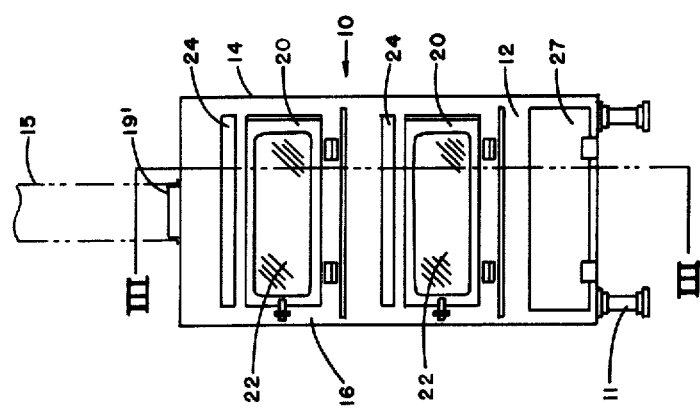
FIG. 1 is a front elevational view of a cooking unit according to the teachings of the present invention.

Front wall 12 of housing 10 is provided with at least one door 20, two being shown in FIG. 1. Doors 20 provide access to fire boxes 30 within housing 10 in which the cooking takes place. Doors 20 are hingedly secured to front wall 12 and are provided with a suitable latch means to secure the door in the closed position until it is desirable to open same. Doors 20 are further preferably provided with glass inserts 22 which are preferably thermal glass to prevent undue dissipation of cooking heat from the fire box, and permit visual inspection of the food during cooking. Further, a hood 24 is preferably provided above each door and is secured to wall 12.

A further feature of the present invention is the tray holding means beneath the doors 20. During placement of food into the unit, basting, removal of food and the like, one is more able to properly perform the desired function with both hands available. The tray holding means comprise a shelf 25 secured to wall 12 and extending outwardly a short distance therefrom. Above shelf 25 is a bracket 26 that extends outwardly from wall 12 and turns downwardly. Bracket 26 is apart from shelf 25 a sufficient amount to permit the lip of a tray to pass therebetween and be held by the downwardly extending portion. A tray may thus be held in cantilevered fashion beneath each door 20.

Figure 2:
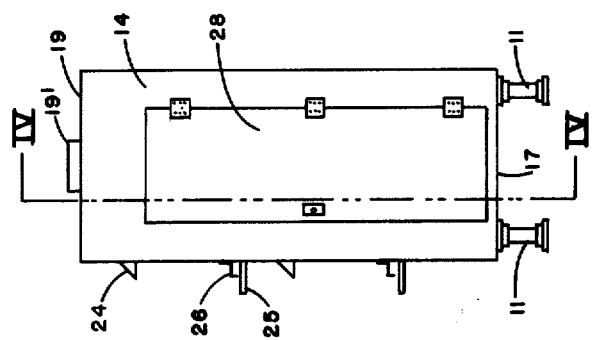
FIG. 2 is a side elevational view of the cooking unit according to the teachings of the present invention.

FIGS. 1 and 2 further illustrate means for providing access to the inside of housing 10 for maintenance and/or repair to the drive system for food supports. A removable panel 27 and a door 28 are provided in walls 12 and 14 respectively for this purpose.

At least one fire box generally indicated as 30 is located within housing 10. A plurality of fire boxes 30 are preferred and are partially enclosed.

Figure 3:
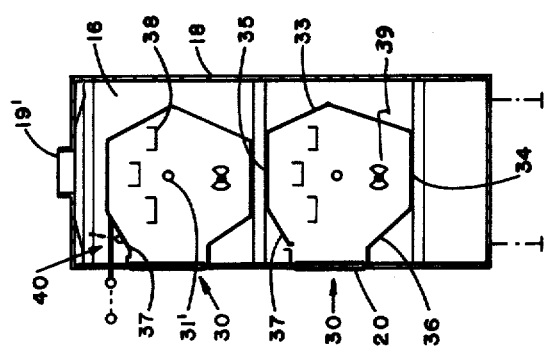
FIG. 3 is a further side cross sectional view of the cooking unit according to the teachings of the present invention taken along a line III—III of FIG. 1.
Figure 4:
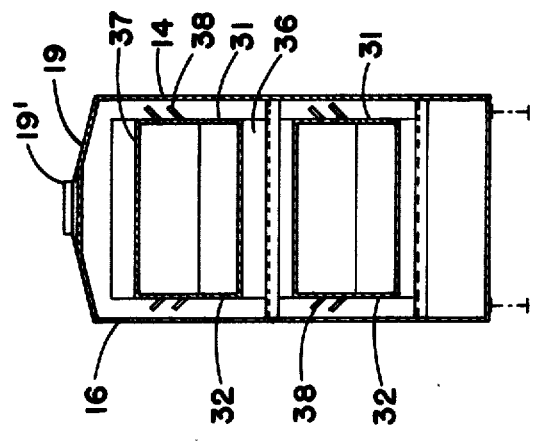
FIG. 4 is a cross sectional view of a cooking unit according to the present invention taken along a line IV—IV of FIG. 2.

Referring to FIGS. 3 and 4, each fire box 30 is made up of side walls 31 and 32, a back wall 33, a bottom 34, a top 35 and an interrupted front wall made up of a lower section 36 and an upper section 37, that define an access opening therebetween. Bottom wall 34, lower front section 36 and back wall 33 define a pit in which charcoal, hickory chips and the like may be placed and burned to provide a source of cooking heat. Likewise, other sources of heat such as electrical coils, gas mantles, or the like may be employed in fire boxes 30. Side walls 31 and 32 and back wall 33 are spaced apart from housing walls 14, 16 and 18, leaving open space therebetween that serves to channel smoke from fire boxes 30 to flue connection 19'. Further, side walls 31 and 32 are provided with a plurality of vents 38 therein through which smoke is permitted to pass into the smoke channels. Side wall 31 or 32 further has an air damper 39 therein to adjust air flow into the pit in the bottom of the fire box. Damper 39 is preferably in wall 31 where ready access is available by way of door 28. Side walls 31 and 32, are also provided with openings 31' and 32' respectively which serve as means to rotatably receive food supports as more fully described hereinafter.

Figure 9:
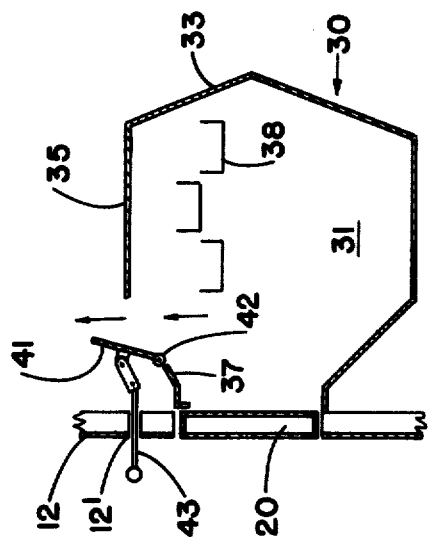
FIGS. 8 and 9 are cut away views of a portion of the housing of the improved cooking unit according to the present invention illustrating a preferred embodiment of smoke diverter means.
Figure 8:
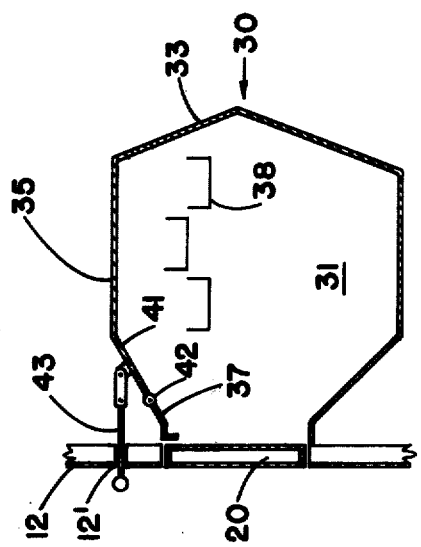

As is best illustrated in FIGS. 8 and 9, upper front wall section 37 is provided with means 40 to divert smoke from within fire boxes 30 away from door 20 when it is desirable to open same. Upper front wall section 37 is provided with a section 41 that is pivotally secured thereto at a hinge or the like 42 and abuts top wall 35 at an opposite end thereof. Section 41 has an elongated element 43 pivotally secured thereto and extending outwardly therefrom through an opening 12' in front wall 12, outside of housing 10. Normally, with section 41 abutting top wall 35, smoke in fire box 30 exits only through vents 38 in side walls 31 and 32. Hence when door 20 is opened, smoke will follow the air currents created through the open door and flow outside of housing 10. Prior to opening door 20, element 43 may be pulled outwardly whereby section 41 moves away from top wall 33 pivoting around hinge 42 and provide a smoke channel thereat which channels smoke away from door 20. Thereafter, door 20 may be opened without smoke billowing out into the area.

Each fire box 30 is provided with a food support means therein that is rotatably secured above the pit in which the heat source is found. Making reference to FIGS. 5, 6 and 7, the rotatable food support means will be described in detail. As mentioned above side walls 31 and 32 are provided with means for rotatably supporting food supports, illustrated in FIG. 3 as openings 31' and 32' respectively. FIG. 6 illustrates a preferred technique for rotatably supporting the food supports and rotary driving means therefor. In FIG. 6, side wall 32 is shown having a bracket 52 secured thereto and having a bifurcated leg 53 or the like which freely receives a spit 50 or the like therein for rotation thereat.

While a spit 50 is illustrated in the drawings, other suitable supports such as baskets or the like may likewise be employed. Side wall 31 receives a bushion 54 therethrough and has a bracket 55 secured thereto. Spit 50 has a collar 56 received around an opposite end thereof and secured thereto. Collar 56 rotatably resides on bracket 55 and is supported thereat. Further, spit 50 has a gear 57 secured around said opposite end, adjacent said collar. Bushion 54 in side wall 31 has an opening 54' therein through which extends a shaft 58. Shaft 58 has a gear 59 secured to one end thereof inside fire box 30, gear 59 being in meshing relationship with gear 57 on spit 50. At the opposite end of shaft 58 is a pulley 61, located outside fire box 30, but inside housing 10.

Figure 6:
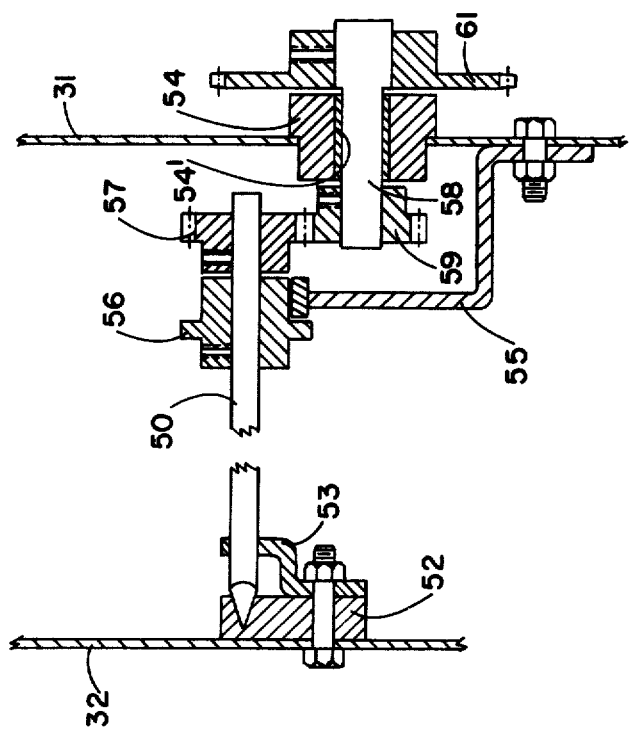
FIG. 6 is a cut away view of a portion of the cooking unit according to the teachings of the present invention illustrating a particular drive embodiment thereof.

FIG. 5 illustrates the drive means for rotating food supports within fire boxes 30. Two drive pulleys 60 are shown, one being provided for each of two fire boxes. A motor 62 is shown in the bottom of housing 10 having a drive pulley 63 associated therewith. A further pulley 64 is journaled for rotation adjacent motor 62 and has a drive sprocket 65 secured thereto. A belt 66 drivingly connects pulleys 63 and 64. A drive belt 67 is secured around sprocket 65, drive pulleys 60 and an idler sprocket 68 to simultaneously drive pulleys 60 for both fire boxes 60. Rotation of pulley 60 causes shaft 58 and gear 59 to rotate. Gear 59 in turn through its meshing relationship with spit gear 57, causes spit 50 to rotate. Food supported on spit 50 would thus continually turn during cooking to prevent burning and insure even and proper cooking.

Figure 7:
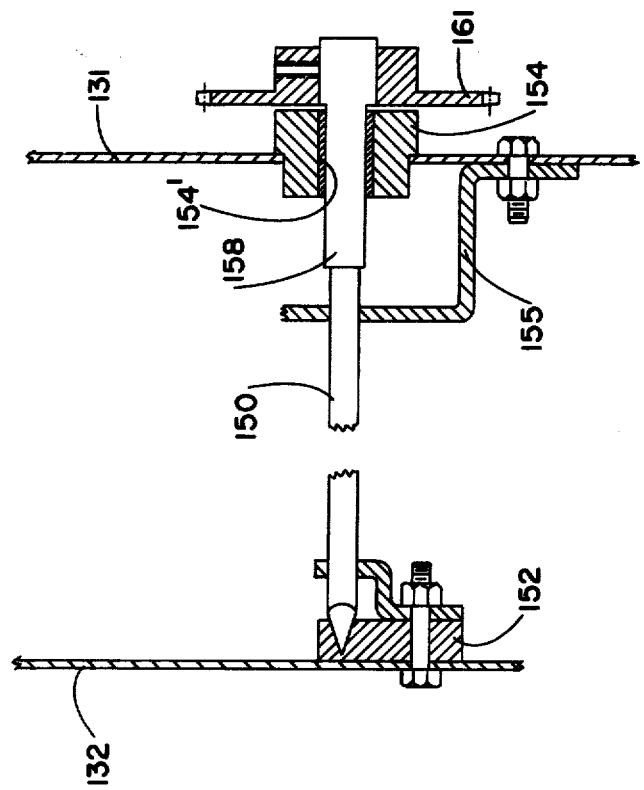
FIG. 7 is a partial cut away view of a housing illustrating a further embodiment of drive means for the food supports.

FIG. 7 shows a further driving embodiment for a spit 150 that is journaled for rotation between fire box walls 131 and 132. Spit 150 is aligned with the opening 154' of a bushing 154 received in side wall 131. A shaft 158 passes through opening 154' and is secured to spit 150 at one end thereof while the opposite end of shaft 158 is secured to a driving pulley 160. Additionally, to remove the weight support from shaft 158, a bracket 155 is secured to the inside of wall 131 and freely rotatably supports spit 150, while the opposite end of spit 150 is freely rotatably supported by a bracket 152.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. An improved cooking unit comprising:
    a. a housing, said housing having a plurality of walls defining same, said housing having a smoke outlet at an upper end thereof, said housing further having a plurality of doors in one of said walls;
    b. a plurality of enclosed fire boxes received within said housing and secured thereto behind said doors, walls of said fire boxes combining with walls of said housing to define smoke channels therebetween, said fire boxes having smoke vents in said walls, each said fire box having a source of heat therein and a rotatable food support received thereabove, a top wall of said fire boxes adjacent said door having a portion thereof hinged for pivotal movement away from said fire boxes to divert smoke from said fire boxes into said smoke channels and away from said door, said hinged wall portion having means secured thereto for movement of same as desired; and
    c. drive means for said rotatable food supports.

2. An improved cooking unit as defined in claim 1 wherein said means secured to said hinged smoke diverter comprises an elongated element that is secured to a free end of said hinged smoke diverter and extends through said wall of said housing adjacent said door.

3. An improved cooking unit as defined in claim 2 wherein a shelf is provided on said housing wall beneath said doors, said shelf having a bracket secured to said wall thereabove, said shelf and said bracket cooperating to provide tray holding means at said doors.

4. An improved cooking unit as defined in claim 3 wherein said rotatable food support comprises a spit, said spit being journaled to said housing at one end thereof and associated with said drive means at an opposite end thereof.

5. An improved cooking unit as defined in claim 4 wherein said drive means comprises a single motor, said motor being connected to and driving said spit for each fire box.

* * * * *